May 21, 1946.  N. D. LEVIN  2,400,835

CLUTCH

Original Filed June 5, 1942

INVENTOR;
NILS D. LEVIN,
BY
ATT'Y.

Patented May 21, 1946

2,400,835

UNITED STATES PATENT OFFICE 2,400,835

CLUTCH

Nils D. Levin, Columbus, Ohio, assignor, by mesne assignments, to The Jeffrey Manufacturing Company, a corporation of Ohio Application June 5, 1942, Serial No. 445,834, which is a division of application Serial No. 170,426, October 22, 1937. Divided and this application November 2, 1944, Serial No. 561,543

5 Claims. (Cl. 74—389)

This invention relates to a clutch or drive mechanism and an object thereof is to provide an improved clutch in which the driving element which is preferably in the form of a clutch housing is employed not only as a drive element of the clutch to interconnect the driving and driven members or shafts selectively but also acts as a direct connecting member between a driving member and a second driven member.

Another object of the invention is to provide a clutch having an enclosing housing or casing which is the driving element of the clutch and is driven by a gear or the like and which casing also acts as a direct driving element or connection to another driven element or gear.

A further object of the invention is to provide an improved compact arrangement of parts in which a driving element of a clutch is employed as a direct drive for a gear or the like and also through clutch engaging and disengaging means selectively drives another member as a shaft or the like.

Other objects of the invention will appear hereinafter the novel features and combinations being set forth in the appended claims.

In the accompanying drawing.

This application is a division of my application, Serial No. 445,834, filed June 5, 1942, entitled Loading machine, which in turn is a division of my application, Serial No. 170,426, filed October 22, 1937, for a Loading machine both of which applications are now abandoned.

In the accompanying drawing I have only illustrated that portion of the loading machine of my applications, above identified, which relates to the clutch herein specifically claimed. For more complete disclosure of one use of this clutch reference is made to the above mentioned applications.

Figure 1:
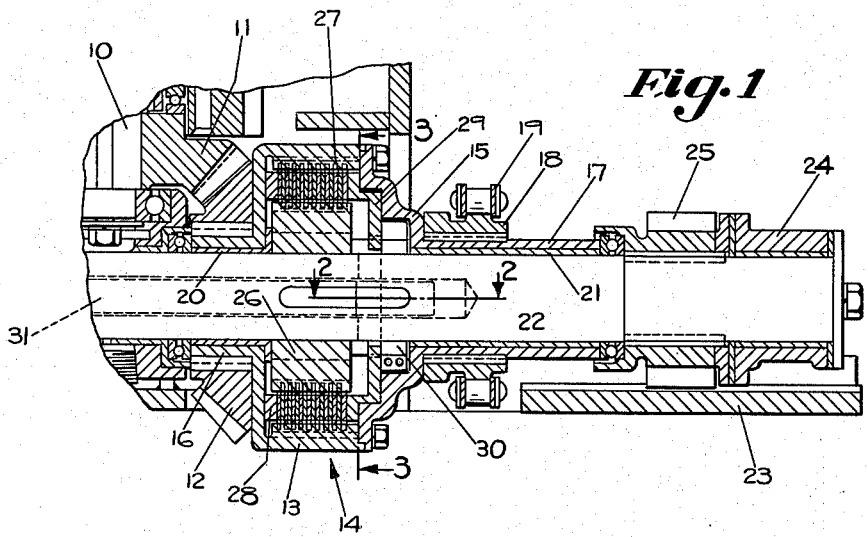
Fig. 1 is a sectional elevational view through mechanism including the clutch of my invention.

Referring particularly to Fig. 1 of the drawing, a driving shaft 10 driven from any source, as from an electric motor, is provided at its bottom with a beveled gear 11 which is in constant mesh with and drives a beveled gear 12. Beveled gear 12 is keyed to a reduced neck 16 of a housing or casing member 13 of a friction type clutch 14. The complete clutch housing is formed by cooperation provided by the housing or casing member 13 and a removable housing plate or cap 15, the outer flange of which is attached to the casing member 13 by machine screws and the right hand portion of which, as viewed in Fig. 1, is provided with an integral neck 17 of reduced diameter. Keyed to the neck 17 is a sprocket type gear 18 which drives a chain 19 which in turn may drive any desired member and in the loader of my applications, above identified, this chain drives the discharge conveyor.

The interior cylindrical surfaces of the necks 16 and 17 are of the same diameter and they are provided with bearings 20 and 21 by which the clutch housing 13, 15 is journaled on a driven shaft 22 which is mounted in spaced bearings on a frame 23, one of said spaced bearings being seen at 24. Shaft 22 has a driven gear 25 keyed thereto which may drive any desired mechanism. In the loaders of my applications, above identified, the gear 25 is one gear of a train which drives the traction wheels thereof. It is to be noted that the necks 16 and 17 through the bearings 20 and 21 have close fit with the shaft 22 so as to provide a substantially complete enclosure for the interior operating mechanism of clutch 14, which shall now be described.

Figure 2:
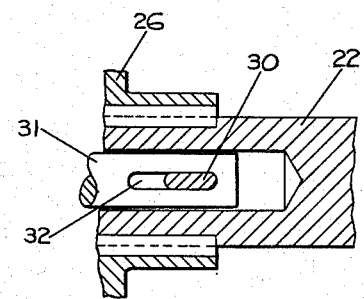
Fig. 2 is a sectional view taken on the line 2—2 of Fig. 1, looking in the direction of the arrows.
Figure 3:
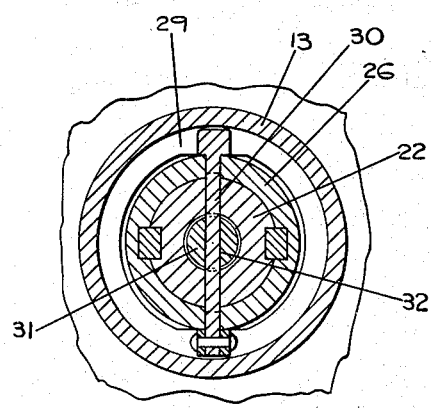
Fig. 3 is a view taken on the line 3—3 of Fig. 1, looking in the direction of the arrows.

The interior of said clutch 14 includes a driven clutch member 26 which is keyed to the shaft 22. Between the driven clutch member 26 and the driving clutch member or housing 13 is a stack of friction discs 27, alternate ones of which are splined to the external surface of the driven member 26 and the interior surface of the driving member 13 in a manner well understood in the art. Engagement and disengagement of the clutch 14 is effected by clamping or releasing the discs 27. To effect this clamping and releasing action, said discs 27 are clamped between a ring 28 on the housing member 13 and a shiftable ring 29 on the opposite side of said stack of discs 27. Ring 29 is moved into clamping engagement position by a key 30 which extends through a radial slot in the shaft 22 and is slidable axially along said shaft by an operating rod 31 having an elongated keyway 32 therein through which the key 30 extends. Obviously by pulling the rod 31 to the left, as viewed in Figs. 1 and 2 of the drawing, the key 30 will be moved to the left, with the ring 29 thus clamping the discs 27 against each other and effecting a driving relation between the driving member 13 of the clutch and driven member 26 thereof. By releasing the rod 31 the discs 27 will respond automatically to disengage said clutch 14.

From the above description it is obvious that the clutch 14 provides an engageable or disengageable drive between the driving shaft 10 and/or the driving gear 12 and the driven shaft 22. Obviously the clutch housing member 13 is an essential part of this driving member. Furthermore, the clutch housing 13, 15 provides a direct positive driving connection from the driving shaft 10 and/or gear 12 to the driven gear or sprocket 18. This is a second function of the housing member 13. In addition, the members 13, 15 have a third function in that they cooperate to provide a substantially complete enclosure for the clutch discs 27 as well as the clutch operating mechanism 29, 30, etc. Whenever the shaft 10 is supplied with power and rotated it is obvious that the driven sprocket gear 18 rotates with it and this is true regardless of the direction of rotation of the shaft 10. On the other hand, the driven shaft 22 is or is not rotated with the driving shaft 10, depending upon whether the clutch 14 is in its engaging or disengaging position.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. Apparatus of the class described including a driven shaft, means for driving said shaft including a friction clutch mounted on said shaft, said clutch including a driven member connected to drive said shaft, a driving member, operable friction means to effect a selective driving or non-driving relation between said driven member and said driving member, said driving member comprising an enclosing casing portion for said driven member and said friction means and having reduced neck portions closely adjacent said shaft and surrounding said shaft and located on opposite sides of said enclosing portion, a gear surrounding said shaft and connected to said casing portion on one side thereof to drive said casing, and another gear surrounding said shaft and connected to the other side of said casing portion, said casing portion thereby acting as a direct driving connection between said two gears and also acting as a driving member for the driven member of said clutch.

2. Drive gearing including a shaft, a driving gear, a clutch mounted on said shaft controlling the driving relation between said driving gear and said shaft, said clutch including a substantially enclosing housing forming a driving member, said driving member having reduced necks on opposite ends mounting it for rotation on said shaft, said driving gear being connected to said driving member on one side thereof and on one of said necks, and a driven gear connected to said driving member on the other side thereof and on the other of said necks, said driven gear being driven from said driving gear directly through said driving member so they always rotate together, and said shaft being selectively driven or not from said driving gear as determined by said clutch.

3. Drive gearing including a shaft, a driving gear, a clutch mounted on said shaft controlling the driving relation between said driving gear and said shaft, said clutch including a driving member, said driving member having reduced necks on opposite ends mounting it for rotation on said shaft, said driving gear being connected to said driving member on one side thereof and on one of said necks, and a driven gear connected to said driving member on the other side thereof and on the other of said necks, said driven gear being driven from said driving gear directly through said driving member so they always rotate together, and said shaft being selectively driven or not from said driving gear as determined by said clutch.

4. Drive gearing including a shaft, a driving gear, a clutch mounted on said shaft controlling the driving relation between said driving gear and said shaft, said clutch including a substantially enclosing housing forming a driving member, said driving member having reduced necks on opposite ends mounting it for rotation on said shaft, said driving gear being connected to said driving member on one side thereof, and a driven gear connected to said driving member on the other side thereof, said driven gear being driven from said driving gear directly through said driving member so they always rotate together, and said shaft being selectively driven or not from said driving gear as determined by said clutch.

5. Drive gearing including a shaft, a driving gear, a clutch mounted on said shaft controlling the driving relation between said driving gear and said shaft, said clutch including a driving member, said driving member having reduced necks on opposite ends mounting it for rotation on said shaft, said driving gear being connected to said driving member on one side thereof, and a driven gear connected to said driving member on the other side thereof, said driven gear being driven from said driving gear directly through said driving member so they always rotate together, and said shaft being selectively driven or not from said driving gear as determined by said clutch.

NILS D. LEVIN.